United States Patent
Kennedy

(10) Patent No.: US 7,586,958 B2
(45) Date of Patent: Sep. 8, 2009

(54) ELECTRO-OPTO SWITCHING OF UNPOLARIZED LASERS

(75) Inventor: Chandler James Kennedy, Town & Country, MO (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/540,461

(22) Filed: Sep. 29, 2006

(65) Prior Publication Data

US 2008/0080569 A1    Apr. 3, 2008

(51) Int. Cl.
*H01S 3/115* (2006.01)
(52) U.S. Cl. .............................. 372/12; 372/18; 372/10
(58) Field of Classification Search .................. 372/12, 372/18, 10
See application file for complete search history.

(56) References Cited

U.S. PATENT DOCUMENTS

| | | | |
|---|---|---|---|
| 3,631,361 A | 12/1971 | Almasi et al. | |
| 3,633,126 A | 1/1972 | Martin et al. | |
| 3,740,663 A * | 6/1973 | Andringa | 372/12 |
| 3,771,031 A | 11/1973 | Kay | |
| 3,810,041 A | 5/1974 | Martin | |
| 3,820,038 A | 6/1974 | Tomlinson | |
| 3,986,130 A | 10/1976 | Soures et al. | |
| 4,068,190 A * | 1/1978 | Ferguson | 372/33 |
| 4,084,883 A | 4/1978 | Eastman et al. | |
| 4,091,274 A | 5/1978 | Angelbeck et al. | |
| 4,156,209 A | 5/1979 | Herbst et al. | |
| 4,225,826 A | 9/1980 | Lewis et al. | |
| 4,228,406 A | 10/1980 | Lewis et al. | |
| 4,233,567 A | 11/1980 | Chernoch | |
| 4,249,141 A | 2/1981 | Brown et al. | |
| 4,468,774 A | 8/1984 | Robbins | |
| 4,507,785 A * | 3/1985 | Richards | 372/12 |
| 4,575,854 A | 3/1986 | Martin | |
| 4,710,940 A | 12/1987 | Sipes, Jr. | |
| 4,730,324 A | 3/1988 | Azad | |
| 4,731,795 A | 3/1988 | Clark et al. | |
| 4,741,354 A | 5/1988 | DeMild, Jr. | |
| 4,876,694 A | 10/1989 | Hughes | |
| 4,896,119 A * | 1/1990 | Williamson et al. | 359/348 |
| 4,949,346 A | 8/1990 | Kuper et al. | |
| 4,972,426 A | 11/1990 | Steffen | |
| 5,084,888 A | 1/1992 | Tajima et al. | |
| 5,084,889 A | 1/1992 | Tajima | |
| 5,138,628 A | 8/1992 | Pocholle et al. | |
| 5,148,445 A | 9/1992 | Liu et al. | |
| 5,150,371 A | 9/1992 | Abramov et al. | |
| 5,156,999 A | 10/1992 | Lee | |

(Continued)

*Primary Examiner*—Dung T Nguyen
(74) *Attorney, Agent, or Firm*—Nixon Peabody LLP

(57) ABSTRACT

A method and apparatus for switching an unpolarized pulsed laser is disclosed. An example is a laser system having a source for producing input energy in response to an input drive signal. A laser medium is provided for receiving the input energy and converting the input energy to a circulating beam which is reflected between an output mirror and a reflective mirror disposed on opposing sides of the laser medium. A displacer is disposed between the mirrors and in a path of the circulating beam. The displacer splits the circulating beam into an e-polarized wave and an o-polarized wave. A Pockels cell is disposed between the displacer and the reflective mirror. The Pockels cell is energized to change the phase of the polarized waves and deenergized to allow transmission of the waves without a phase change.

17 Claims, 4 Drawing Sheets

U.S. PATENT DOCUMENTS

| | | | |
|---|---|---|---|
| 5,239,549 A | 8/1993 | Tajima et al. | |
| 5,253,260 A | 10/1993 | Palombo | |
| 5,287,368 A * | 2/1994 | Fink | 372/32 |
| 5,291,504 A | 3/1994 | Bournes | |
| 5,394,426 A * | 2/1995 | Joslin | 372/50.12 |
| 5,394,427 A | 2/1995 | McMinn et al. | |
| 5,434,875 A | 7/1995 | Rieger et al. | |
| 5,521,936 A | 5/1996 | Irwin | |
| 5,550,853 A | 8/1996 | Ostler | |
| 5,561,684 A | 10/1996 | Martin | |
| 5,563,899 A | 10/1996 | Meissner et al. | |
| 5,663,979 A | 9/1997 | Marshall | |
| 5,663,980 A | 9/1997 | Adachi | |
| 5,734,672 A | 3/1998 | McMinn et al. | |
| 5,740,288 A | 4/1998 | Pan | |
| 5,852,622 A | 12/1998 | Meissner et al. | |
| 5,898,211 A | 4/1999 | Marshall et al. | |
| 5,913,108 A | 6/1999 | Stephens et al. | |
| 5,936,984 A | 8/1999 | Meissner et al. | |
| 5,985,684 A | 11/1999 | Marshall et al. | |
| 6,014,393 A | 1/2000 | Fulbert et al. | |
| 6,026,109 A | 2/2000 | Micke et al. | |
| 6,061,378 A * | 5/2000 | Marshall et al. | 372/75 |
| 6,094,297 A | 7/2000 | Injeyan et al. | |
| 6,178,040 B1 | 1/2001 | Injeyan et al. | |
| 6,490,299 B1 | 12/2002 | Raevsky et al. | |
| 6,711,311 B2 | 3/2004 | Delisle et al. | |
| 6,744,803 B2 | 6/2004 | Kennedy | |
| 6,765,722 B2 | 7/2004 | Ye | |
| 6,822,994 B2 | 11/2004 | Kennedy | |
| 2002/0110164 A1 | 8/2002 | Vetrovec | |
| 2002/0118718 A1 | 8/2002 | Honea et al. | |
| 2005/0267345 A1 * | 12/2005 | Korgel et al. | 600/317 |

* cited by examiner

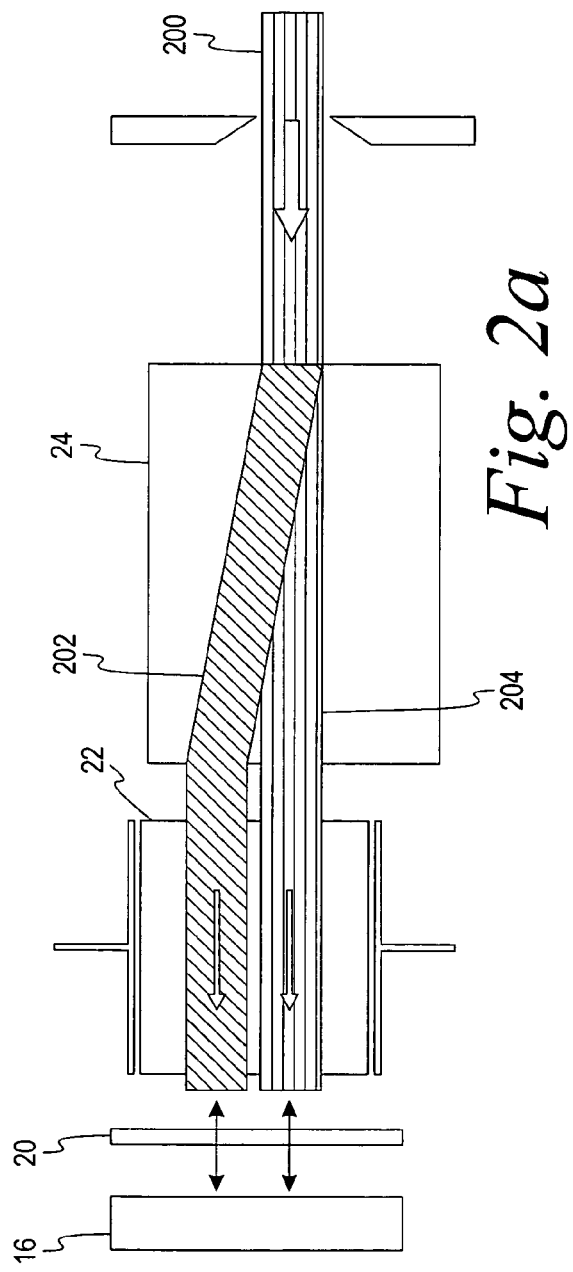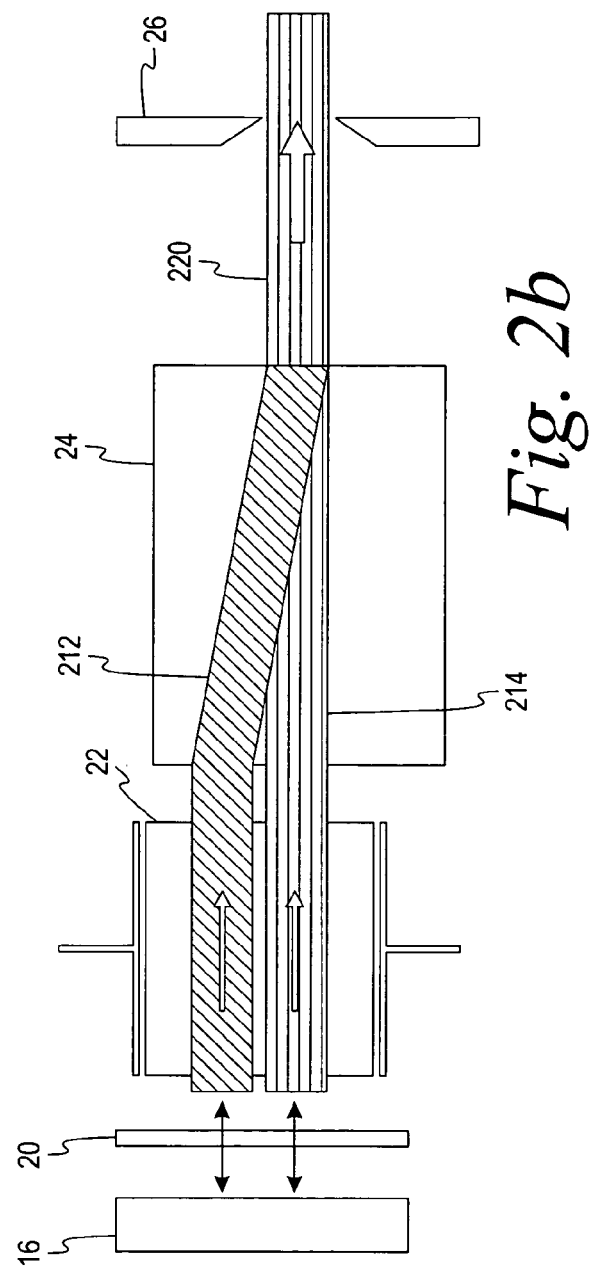

ELECTRO-OPTO SWITCHING OF UNPOLARIZED LASERS

FIELD OF THE INVENTION

The present invention relates generally to laser diodes and, in particular, to a method and apparatus for a laser oscillator allowing high frequency switching of an unpolarized laser beam output.

BACKGROUND OF THE INVENTION

Solid-state laser systems have a solid-state laser gain medium that converts energy from an optical pump source into a coherent beam. The pump source can be one of many available energy-producing systems such as flash lamps or semiconductor laser diodes. The energy produced by the pump source is incident upon the laser medium and absorbed by the laser medium.

The absorbed energy in the laser medium causes certain atoms in the laser medium to be excited into a higher energy state. Once at this higher state, these atoms release optical energy by amplifying light which is passed through it. The optical amplifier can be placed into an oscillating state by the use of optical feedback. The laser oscillator includes at least two reflective surfaces located on either side of the laser medium in order to provide this feedback. The laser oscillator may be designed to continuously release a laser beam from the system. Alternatively, the oscillator can be designed such that when the energy stored in the laser medium reaches a predetermined level, it is released from the system as a high-power, short-duration pulsed laser beam.

In many systems, the laser medium is Neodymium-doped, Yttrium-Aluminum Garnet (Nd:YAG). A laser medium made from Nd:YAG absorbs optical energy most readily when the energy is at a wavelength of approximately 808 nm. Thus, the source to pump the Nd:YAG laser medium should be emitting light energy at approximately 808 nm. Gallium arsenide semiconductor laser diodes may be manufactured with dopants (e.g., aluminum) that will cause the emitted light to be in a variety of wavelengths, including 808 nm. Thus, the semiconductor laser diodes, which are lasers by themselves, act as the pump source for the laser medium.

Many laser systems emit energy in a pulsed mode. To accomplish this function, a laser system may include a Q-switch that is made of a material having rapidly alterable optical properties that result in changing the overall loss of the oscillator in which it is placed. One such device is the Acousto-Optic (AO) Q-switch. This Q-switch is activated between an "opened" state and a "closed" state by a radio frequency (RF) signal, which typically operates in the range of 27 MHz to 80 MHz. When the RF signal is applied, a loss is induced in a properly aligned optical beam which passes through the Q-switch by diffracting the light off an acoustic wave inside the Q-switch material, resulting in the "closed" state. Any energy that oscillates within a laser oscillator encounters the loss produced by the Q-switch, which, if it is larger than the gain through the laser medium, prevents it from building to appreciable levels. Hence, there is no laser output power from the system when the RF signal is applied to the Q-switch. When the RF input signal is removed from the Q-switch (i.e., the "opened" state), the beam passes through the laser medium and the gain in the system overcomes the residual loss of the laser oscillator, resulting in a pulse of energy being emitted from the laser system. Furthermore, the amount of loss induced in the laser oscillator by an AO Q-switch is largely independent of polarization state, making this device one of the few Q-switches that are effective in an unpolarized laser typical of Nd:YAG systems.

As an example, the Q-switch can cause the laser system to produce consistent pulses of energy at a range of repetition frequencies from 1 Hz to 50 kHz. This is accomplished by quickly switching between the "opened" state and the "closed" state at this frequency. The emitted energy produced from a solid-state laser system is generally coherent and exits the system in a predefined area. Thus, the optical power produced can be readily focused by the use of other optical components such as lenses. The resultant emitted energy can be used for a variety of industrial, medical, and scientific purposes such as cutting material, melting materials, ablating materials or vaporizing materials.

However, the opening of the acousto-optic Q-switch is relatively slow (on the order of 200 ns per mm of beam width) as the ultrasonic wave must propagate from one edge of the laser beam to the other and thus the efficient pulsing of the beam is limited to relatively low gain oscillators that require more than this time for the pulse to build to full intensity. High gain oscillators that have shorter build-up times can only be Q-switched by Electro-Optic (EO) devices which open in only about 20 ns. The EO device, however, is only effective in polarized lasers. While Nd:YAG can be polarized by inserting an appropriate optical device, this often results in unacceptably high losses and poor efficiency.

There is thus a need for a laser pulse oscillator that allows for the rapid loss-switching of an unpolarized beam.

SUMMARY OF THE INVENTION

One example disclosed is a laser system having a source for producing input energy in response to an input drive signal. A laser medium receives the input energy and converts the input energy to a circulating beam. First and second mirrors are disposed on opposing sides of the laser medium. The circulating beam is reflected between the first and second mirrors. The first mirror is an output mirror for releasing a pulsed laser beam. A displacer is disposed between the first and second mirrors and in a path of the circulating beam. The displacer splits the output beam into an e-polarized wave and an o-polarized wave. A Pockels cell is disposed between the displacer and the second mirror. The Pockels cell is energized to change the polarization state of the polarized waves and deenergized to allow transmission of the waves without changing the polarization state. A control system is coupled to the Pockels cell to switch between a first state allowing the release of the pulsed laser beam and a second state dispersing the circulating beam via the displacer preventing the release of the pulsed laser beam.

Another example disclosed is a method of generating a pulsed laser beam from a laser system. The laser system includes a source that produces input energy and a laser medium that receives the input energy. The laser medium converts the input energy to n circulating beam that reflects between first and second reflective surfaces. The circulating beam is displaced into an e-polarized wave and an o-polarized wave. The e-polarized wave and o-polarized wave are reflected on the second reflective surface toward the first reflective surface. Switching is performed between (i) an "off" condition to disperse the reflected e-wave and o-wave; and (ii) an "on" condition to combine reflected e-wave and o-wave into the circulating beam that passes through the laser medium and creates the pulsed laser beam.

Another example disclosed is a laser system including a source for producing input energy and a laser medium for receiving the input energy and converting the input energy to a circulating beam. First and second reflective surfaces reflect the circulating beam therebetween and at least one of the reflective surfaces release a pulsed laser beam having an energy level. A displacer is disposed between the first and second reflective surface to split the circulating beam into an e-polarized wave and an o-polarized wave reflected by the second reflective surface. A Pockels cell is disposed between the displacer and second reflective surface. The Pockels cell is made of material having an optical property alterable in response to a voltage input. A control system is coupled to the Pockels cell to control the frequency of an "on" condition where the reflected e-polarized wave and the o-polarized wave are combined into the circulating beam and an "off" condition wherein the e-polarized wave and o-polarized beam are dispersed The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

FIG. 2A is a side view of part of the laser oscillator system of FIG. 1 showing the beam paths proceeding from the amplifying medium to the second mirror in both on and off states;

FIG. 2B is a side view of part of the laser oscillator system of FIG. 1 showing the beam paths returning from the second mirror in the on state;

Figure 1:
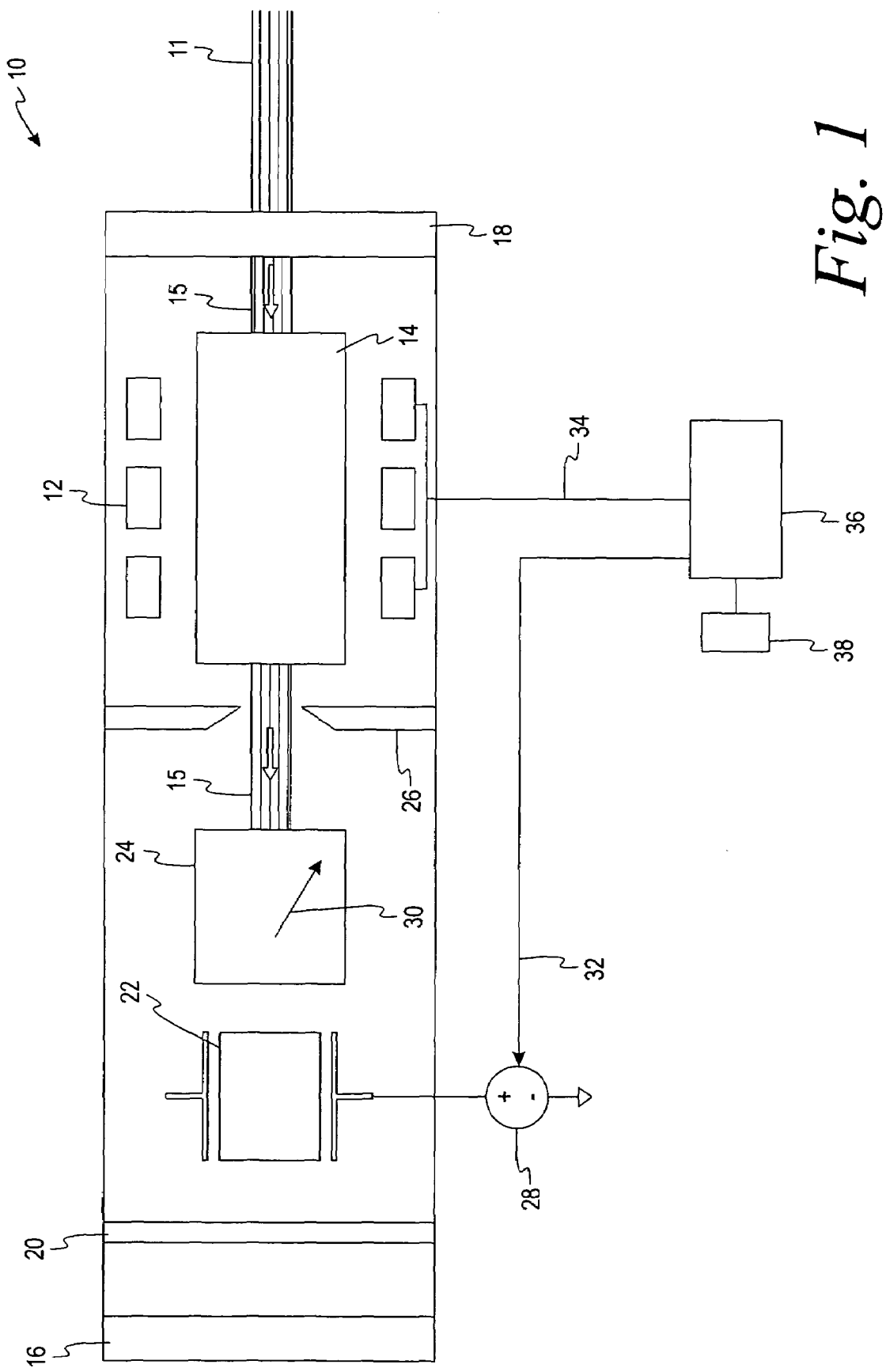
FIG. 1 is a side view of an example laser oscillator system that allows high frequency switching of an unpolarized beam.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

One example disclosed is a laser system having a source for producing input energy in response to an input drive signal. A laser gain medium amplifies the beam energy. First and second mirrors are disposed on opposing sides of the laser gain medium. The beam is reflected between the first and second mirrors. The first mirror is an output mirror for releasing a portion of the power circulating between the two mirrors. A birefringent beam displacer is disposed between the second mirror and the gain medium in the path of the circulating power. The displacer splits the incident unpolarized beam from the gain medium into two linearly polarized beams which are displaced laterally, but propagate in parallel. These two states of polarization are known as "e" and "o". The e-polarized beam is displaced laterally and the o-polarized beam is unchanged.

A Pockels cell is disposed between the displacer and the second mirror, intercepting both polarized beams. The Pockels cell is energized with a high voltage signal to alter the state of the polarized waves and deenergized to allow transmission of the waves without alteration. The second mirror of the system is used to return the separated polarized beams along a path directly opposed to the input direction to the mirror. The beams then make a second, return, pass through the Pockels cell after which the state of polarization of the separated beams is either changed or unchanged, depending on the action of the Pockels cell. If the state of polarization of the beams has been changed, then they do not return along the same paths through the displacer optic in which they had entered, that is, they remain separated and may be intercepted by an appropriate aperture disposed between the displacer optic and the amplifying medium. If, however, the state of polarization of the beams has been unchanged, then they return along the same paths they occupied on entering the beam displacer optic and recombine into a single beam which passes entirely through the aforesaid aperture. A control system is coupled to the Pockels cell to switch between a first state allowing the release of the pulsed laser beam and a second state dispersing the output beam via the displacer preventing the release of the pulsed laser beam.

FIG. 1 illustrates a solid-state laser system 10 for producing a high-power pulsed output laser beam 11. The laser system 10 includes a pump source 12 that pumps a solid state laser medium 14, which in the illustrated embodiment is in the form of a rod or a slab. The pump source 12 is preferably one or more laser diode arrays although other sources, such as a flash lamp, may be used. Each laser diode array typically has several semiconductor laser diodes that convert electrical energy into optical energy that is absorbed in the laser medium 14.

The laser system 10 includes two reflective surfaces such as a high reflective mirror 16 and an output coupling (OC) mirror 18. A quarter wave plate 20, a Pockels cell 22 and a beam displacer 24 are disposed between the high reflective mirror 16 and the laser medium 14. An aperture 26 is disposed between the beam displacer 24 and the laser medium 14. A high voltage source 28 drives the Pockels cell 22.

The amount of absorption of energy by the laser medium 14 at a given wavelength depends on various factors such as the type of dopants provided in the laser medium 14, the concentration of dopants, and the temperature at which the laser medium 14 is operated. By way of example, if the laser medium 14 is made from Neodymium (3+) doped, Yttrium-Aluminum Garnet (Nd:YAG), the peak absorption occurs at about 808 nm. When the laser diodes at the pump source 12 are made of gallium arsenide with aluminum doping (AlGaAs), they emit radiation at approximately 804 nm to 808 nm, which matches the maximum absorption spectrum for the Nd:YAG material of the laser medium 14. When an Nd:YAG laser medium absorbs energy at 808 nm, it then can release energy at a variety of wavelengths, the strongest of which is 1064 nm. These materials for the pump source 12 and the laser medium 14 are used in one example of the solid state laser system 10.

To produce laser resonation, a reflective surface must be positioned outside of each end of the laser medium 14 to cause a circulating beam 15 to be continuously sent back through the laser medium 14 to achieve further "gain." The high-reflective (HR) mirror 16 is typically mounted on a common mounting structure (e.g., optics bench assembly) with the laser medium 14. The surface of the HR mirror 16 typically has a reflectivity value of at least about 99% at the wavelength of the circulating beam 15.

The output coupling (OC) mirror 18 is located on the opposite side of the laser medium 14 such that the circulating beam 15 resonates between the HR mirror 16 and the OC mirror 18. The OC mirror 18 has a partially reflective coating on its surface such that a predetermined amount of the circulating beam 15 is transmitted therethrough and released as the output laser beam 11. The remaining energy is reflected back toward the laser medium 14. The reflectivity of the OC mirror 18 determines the overall output in the laser beam 11. Also, the reflectivity must be enough to produce resonation through the laser medium 14. The OC mirror 18 can have a reflectivity that ranges from about 10% (high-gain system) to about 95% (low-gain system) with the optimum value being dependent on the amount of gain and loss in the circulating beam path. In one preferred embodiment, for the laser system 10 operating in a pulsed mode, the reflectivity of the OC mirror 18 is approximately 80%. Also, one of the mirrors 16 or 18 can be a coating placed on the end surface of the laser medium 14.

The quarter waveplate 20 may be formed of crystal quartz or other birefringent material and serves to transform linearly polarized light into circularly polarized light. Upon retuning from mirror 16 the polarization state of the light is further changed from circular to linear with the plane of polarization 90 degrees from the plane of polarization of the input beam. In other embodiments, devices or objects other than the quarter waveplate 20 may be utilized to shift the polarization of the return beam, or waveplate 20 may be absent.

To provide switching of the laser output, the Pockels cell 22 is disposed in the path of the circulating beam 15 from the laser medium 14 to the HR mirror 16. The Pockels cell 22 is an electro-optic crystal which when energized by a high voltage source 28 alters the polarization phase of the circulating beam 15 by a quarter wave (90 degrees) in the same way as the waveplate 20. As those of skill in the art will appreciate, other phase displacements may be made by the Pockels cell 22.

In this example, the beam displacer 24 is a birefringent beam displacer which has sufficient dimensions to accommodate the circulating beam 15. In this example, the beam displacer 24 may be a beam displacer manufactured by, e.g., Conex, headquartered in Pleasanton, Calif., or Karl Lambrecht, headquartered in Chicago, Il. The birefringent beam displacer 24 is formed of a birefringent material such as, e.g., yttrium vanadate, calcite, or rutile, each of which are synthetically developed optical materials with very high birefringence. The birefringent beam displacer 24 may be coated with anti-reflection coating to minimize the amount of energy lost by the light beam while inside the birefringent beam displacer 24. Birefringent materials have optical properties such that the speed of light passing through them is dependent upon the direction of polarization. That is, the refractive index of birefringent materials is dependent upon the direction of the light beam's polarization.

The beam displacer 24 has an optic axis 30 which represents a certain direction or directions with respect to the crystal structure of the birefringent material. A light beam that has an electric field polarized completely perpendicular to the optic axis 30 is called an ordinary wave, or o-wave. A light beam having an electric field that is in the plane of the optic axis and not perpendicular to it 30 is called an extraordinary wave, or e-wave. An o-wave of a laser beam passes straight through the bifrefringent beam displacer 24 on a path parallel with the x-axis in FIG. 1. The e-wave of the beam, however, does not pass straight through the beam displacer 24. Instead, because its polarization is in the plane of the optic axis 30, its power propagates at a slight angle away from the direction of the circulating beam 15. Once the e-wave reaches the opposite edge of the birefringent beam displacer 24, it exits the birefringent beam displacer 24 at a direction parallel to the circulating beam 15. The change in direction of the e-wave is known as a Poynting vector walkoff. The angle of the walkoff may be for example about 4 degrees. The angle of the walkoff dictates the overall length of the beam displacer 24, depending upon the amount of displacement desired. Each type of beam displacer 24 has an inherent walk-off angle that is a function of its optical properties.

The e-wave experiences a walkoff such that when the e-wave exits the birefringent beam displacer 24, it is no longer overlapping the o-wave. The length of the birefringent beam displacer 24 is designed so that there is ideally no overlap between the o-wave and the e-wave, although in practical operation, small overlaps may be acceptable.

The laser system 10 also includes a Pockels cell power input 32 for supplying an input signal to the Pockels cell 22 and a pump-source power input 34 for supplying input power to the pump source 12. The Pockels cell power input 32 and the pump-source power input 34 include the drive electronics for operating the Pockels cell 22 and pump source 12, respectively. Typically, the laser system 10 includes a laser control system 36 that controls both the Pockels cell power input 32 and the pump-source power input 34. The control system 36 sends a drive input signal to the pump source 12 via the pump-source power input 34. An input device 38 allows the operator of the laser system 10 to enter information for determining the characteristics (e.g., power level, pulse width, frequency, etc.) of the laser beam 11 that exits the system 10. The input device 38 can be directly coupled to the laser control system 36. Alternatively, the input device 38 can communicate with the laser control system 36 from a remote location.

Figure 2C:
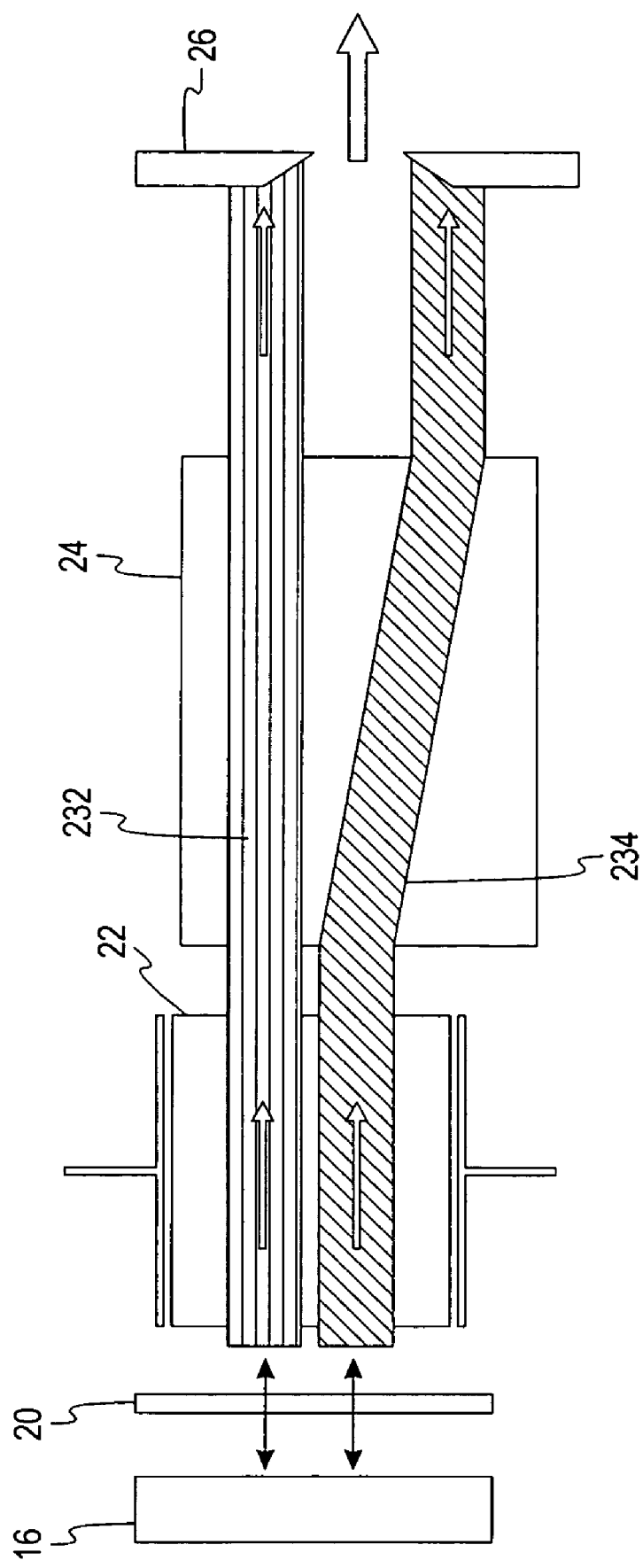
FIG. 2C is a side view of part of the laser oscillator system of FIG. 1 showing the beam paths returning from the second mirror in an off state.

FIGS. 2A-2C shows the operation of the laser system 10. In FIG. 2A, the laser system 10 is in either the "on" or "off" condition. The laser medium 14 produces the circulating beam 15 that is reflected from the OC mirror 18 to form an intracavity beam 200 propagating toward the HR mirror 16. The intracavity beam 200 is split into an e-polarized wave 202 and an o-polarized wave 204 by the beam displacer 24. The e-polarized wave 202 is displaced by the walkoff angle of the displacer 24 while the o-polarized wave 204 passes directly through the displacer 24. The e-polarized wave 202 and the o-polarized wave 204 travel to the Pockels cell 22. The waves 202 and 204 then proceed to travel through the quarter waveplate 20. The quarter waveplate 20 changes the phase of the shifted waves 202 and 204 by 90 degrees. The phase shifted waves 202 and 204 then are reflected off of the high reflective mirror 16.

As shown in FIG. 2B illustrating the "on" condition, the polarization state of the e- and o-waves are phase shifted by the Pockels cell so that the beams are circularly polarized, but in opposite senses, the polarization of the beams 202 and 204 are then shifted by the quarter waveplate 20 so that they are returned to their original polarization state. The process is repeated after reflection from the HR mirror 16 so that when the beams are then shifted a final time by the Pockels cell 22, they are transformed into linear polarization states which are the same as the input. Thus, the combination of the waveplate 20 and the energized Pockels cell 22 results in a returned e-polarized wave 212 and a returned o-polarized wave 214 which are in the same polarization states as the original waves 202 and 204. The e-polarized return wave 212 is displaced at the walk off angle while the o-polarized wave 214 travels parallel to the x-axis of the beam displacer 24. When the e-polarized return wave 212 exits the wave displacer 24, it overlaps the o-polarized return wave 214 to form a single unpolarized return beam 220. The returned waves 212 and 214 are thus combined by the beam displacer 24 and returned through the laser medium 14 (FIG. 1) as the single unpolarized return beam 220 via the aperture 26. The "on" condition results in a period of energy buildup from the excitation of the unpolarized beam 220 causing a pulsed output beam to be emitted from the OC mirror 16 when a threshold output energy is reached.

The oscillation cycle of the pulsed output beam is controlled by the operation of the Pockels cell 22 via the controller 36, which alternates the laser system 10 from the "on" condition to an "off" condition according to a desired frequency FIG. 2C shows the result of the original polarized waves 202 and 204 from FIG. 2A when the system 10 is in the "off" condition. In FIG. 2C, high voltage input 28 has been removed from the Pockels cell 22 via the Pockels cell control input 32 in FIG. 1. The incoming polarized waves 202 and 204 in FIG. 2A have traveled through the Pockels cell 22 with no polarization change. The original polarized waves 202 and 204 have been circularly polarized while passing through the quarter waveplate 20. The waves 202 and 204 are reflected back via the HR mirror 16 and pass through the quarter waveplate 20 again and are brought back to linear polarization, but in opposite states. This results in the original o-polarized wave 204 becoming a returned e-polarization wave 234 and the original e-polarized wave 202 becoming a returned o-polarized wave 232. The returned o-polarized wave 232 travels on a path through the Pockels cell 22 and through the displacer 24 parallel to the x-axis to impinge away from the aperture 26. Similarly, the returned e-polarized wave 202 travels through the Pockels cell 22 and is displaced at the walkoff angle in the beam displacer 24 to impinge away from the aperture 26. Since the return waves 232 and 234 are both impinged away from the aperture 26, the circulating beam 15 from the laser medium 14 in FIG. 1 does not fully transmit through the aperture 26, but instead, a portion of the circulating beam 15 is diverted off axis to create a loss that is larger than the gain produced by the laser medium 14. Thus, no laser beam 11 may exit from the laser system 10.

In other words, when the Pockels cell 22 is de-energized as shown in FIG. 2C, the laser system 10 is in the "off" condition and the lasing action produced by the laser medium 14 is suppressed. When the Pockels cell 22 is energized and the laser system 10 is in the "on" condition to allow for optical transmission as shown in FIGS. 2A-2B, the circulating beam 15 fully resonates between the two mirrors 16 and 18 such that a high-energy, short-duration pulse exits from the laser system 10 as the laser beam 11.

Figure 3:
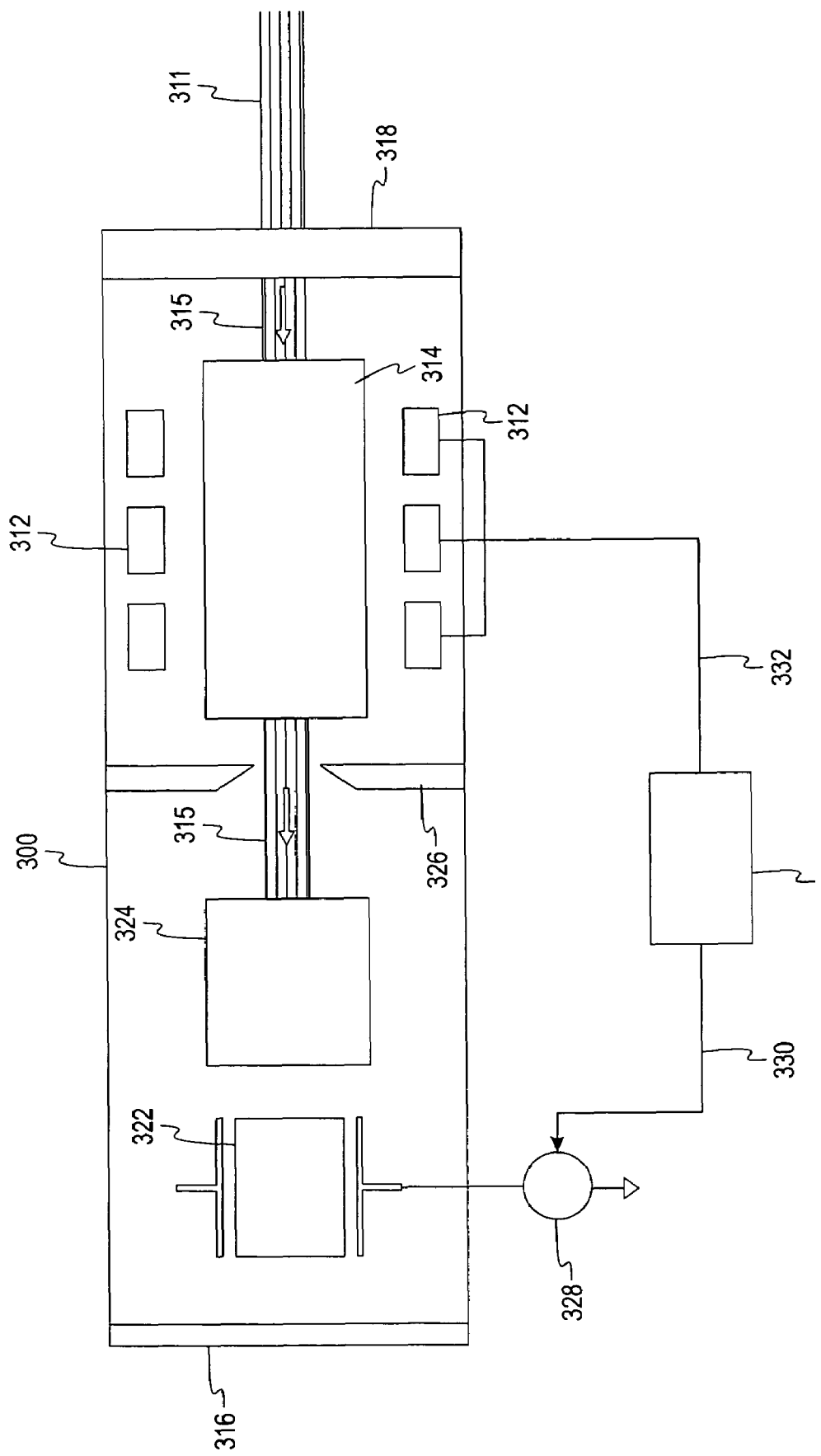
FIG. 3 is a side view of another example laser oscillator system that allows high frequency switching of an unpolarized beam.

FIG. 3 illustrates another laser oscillator system 300 which produces a pulsed output unpolarized beam 311 via a pump source 312 that pumps a solid state laser medium 314. The laser oscillator system 300 differs from the laser oscillator system 10 in FIG. 1 in the elimination of the quarter waveplate 20. The laser system 300 includes two reflective surfaces such as a high reflective mirror 316 and an output coupling (OC) mirror 318. A Pockels cell 322 and a beam displacer 324 are interposed between the high reflective mirror 316 and the laser medium 314. An aperture 326 is interposed between the beam displacer 324 and the laser medium 314. A high voltage source 328 drives the Pockels cell 322. The Pockels cell is controlled via a control input 330 and the pump source 312 is controlled via an input 332. The control inputs 320 and 332 and the pump input 312 are coupled to a controller 334. The components of the system 300 in FIG. 3 operate identically to their counterparts in FIG. 1.

The system 300 has an "on" condition where the high voltage source 328 is decoupled from the Pockels cell 322. A circulating beam 315 from the laser medium 314 is split into an o-polarized wave and an e-polarized wave by the beam displacer 324. Since the Pockels cell 322 is de-energized, the polarized waves pass through the Pockels cell 322 and are reflected by the high reflective mirror 316. The reflected waves do not shift in polarization and thus are recombined to the circulating beam 315 which travels through the aperture 326 to excite the laser medium 314 and increase the gain of the laser system 300 to produce an unpolarized laser pulse from the OC mirror 318.

The system 300 is switched to an "off" state by energizing the Pockels cell 322 via the high voltage source 328. The circulating beam 315 is split into an o-polarized wave and an e-polarized wave by the beam displacer 324 as in the "on" condition. The Pockels cell 322 is energized and transforms the polarization of the waves to circular polarization. The transformed waves are reflected by the high reflective mirror 316 and pass through the Pockels cell 322 again. The Pockels cell 322 further transforms the polarization of the waves from circular back to linear, but opposite in orientation from the input state. This results in the original o-polarized wave being shifted to an e-polarized wave which is displaced at the walkoff angle of the displacer 324. The resulting wave path impinges away from the aperture 326. Similarly, the original e-polarized wave is shifted to an o-polarized wave that is on a path impinging away from the aperture 326. The circulating beam 315 does not fully transmit through the aperture 326, but instead, a portion of the circulating beam 315 is diverted off axis to create a loss that is larger than the gain produced by the laser medium 314. The controller 334 adjusts the frequency of the laser pulse cycle via the control input 330 and the characteristics of the beam via the input 332.

The examples explained above provide relatively faster switching from "off" to "on" states in comparison to a piezo-acoustic Q-switch for non-polarized lasers. The switching speeds for the above examples are in the 20 ns range. This is a significant increase over the switching speed of 1000 ns for a piezo-acoustic Q-switch in a 5 mm diameter beam. Such examples may be employed in applications such as laser marking, or materials processing, cutting or welding.

While the present invention has been described with reference to one or more particular embodiments, those skilled in the art will recognize that many changes may be made thereto without departing from the spirit and scope of the present invention. For example, a slab may be used for the laser medium rather than a rod. Each of these embodiments and obvious variations thereof is contemplated as falling within the spirit and scope of the claimed invention, which is set forth in the following claims.

What is claimed is:

1. A laser system, comprising:
a source for producing input energy in response to an input drive signal;
a laser medium for receiving the input energy and convening the input energy to a circulating beam;
first and second mirrors disposed on opposing sides of the laser medium, the circulating beam reflecting between the first and second mirrors, the first mirror being an output mirror for releasing a pulsed laser beam and wherein the first mirror is a coating on an end surface of the laser medium;
a displacer disposed between the first and second mirrors and in a path of the circulating beam, the displacer splitting the circulating beam into an e-polarized wave and an o-polarized wave the displacer displacing either the e-polarized wave or the o-polarized wave in a direction parallel to the circulating beam;

an aperture disposed between the displacer and the laser medium to block the circulating beam from the displacer;

a Pockels cell disposed between the displacer and the second mirror, the Pockels cell being energized to change the polarization state of the polarized waves and deenergized to allow transmission of the waves without a polarization change; and a control system coupled to the Pockels cell to switch between a first state allowing the release of the pulsed laser beam and a second state dispersing the circulating beam via the displacer by displacing either the e-polarized wave or the o-polarized wave returned in a direction parallel to the circulating beam, preventing the release of the pulsed laser beam.

2. The laser system of claim 1, wherein the source includes a laser diode array.

3. The laser system of claim 1, further comprising a quarter waveplate disposed between the Pockels cell and the second mirror, wherein the first state is activated by energizing the Pockels cell and the second state is activated by deenergizing the Pockels cell.

4. The laser system of claim 1, wherein the first state is activated by deenergizing the Pockels cell and the second state is activated by energizing the Pockels cell.

5. The laser system of claim 1, wherein the displacer is composed of a birefringent material from the group of yttrium vanadate, calcite, or rutile.

6. The laser system of claim 1, wherein the laser medium is a rod.

7. The laser system of claim 1, further including an input device coupled to the control system, the input device for receiving commands from an operator to control the frequency of switching between the first and second state.

8. A method of generating a pulsed laser beam from a laser system including a source that produces input energy and a laser medium that receives the input energy, the laser medium converting the input energy to a circulating beam that reflects between first and second reflective surfaces, the method comprising:

displacing the circulating beam into an e-polarized wave and an o-polarized wave in a direction parallel to the circulating beam;

reflecting the e-polarized wave and o-polarized wave on the second reflective surface toward the first reflective surface;

positioning an aperture between the displacer and the laser medium to block the circulating beam from the displacer; and switching between (i) an off condition to disperse the reflected e-wave and o-wave by displacing either the e-polarized wave or the o-polarized wave returned in a direction parallel to the circulating beam; and (ii) an on condition to combine the reflected e-wave and o-wave into the circulating beam that passes through the laser medium and creates the pulsed laser beam.

9. The method of claim 8, wherein the source includes a laser diode array.

10. The method of claim 8, wherein the displacing the circulating beam is performed via a birefringence beam displacer.

11. The method of claim 10 further comprising positioning a quarter waveplate and a Pockels cell between the displacer and the second reflective surface, wherein the on condition is activated by energizing the Pockels cell and the off condition is activated by deenergizing the Pockels cell.

12. The method of claim 10, further comprising positioning a Pockels cell between the displacer and the second reflective surface wherein the on state is activated by deenergizing a Pockels cell and the off state is activated by energizing the Pockels cell.

13. The method of claim 10, wherein the laser medium is a rod.

14. A laser system, comprising:

a source for producing input energy;

a laser medium for receiving the input energy and converting the input energy to a circulating beam;

first and second reflective surfaces for reflecting the circulating beam therebetween, at least one of the reflective surfaces releasing a pulsed laser beam having an energy level;

a displacer disposed between the first and second reflective surface to split the circulating beam into an e-polarized wave and an o-polarized wave in a direction parallel to the circulating beam, the e-polarized wave and o-polarized wave reflected by the second reflective surface;

a Pockels cell disposed between the displacer and second reflective surface, the Pockels cell being made of material that has an optical property that is alterable in response to a voltage input;

an aperture disposed between the displacer and the laser medium to block the circulating beam from the displacer; and a control system coupled to the Pockels cell to control the frequency of an on condition wherein the reflected e-polarized wave and the o-polarized wave are combined into the circulating beam and an off condition wherein the e-polarized wave and o-polarized beam are dispersed by displacing either the e-polarized wave or o-polarized wave returned in a direction parallel to the circulating beam.

15. The laser system of claim 14, further comprising a quarter waveplate disposed between the Pockels cell and the second reflective surface, wherein the on condition is activated by energizing the Pockels cell and the off condition is activated by deenergizing the Pockels cell.

16. The laser system of claim 14, wherein the on condition is activated by deenergizing the Pockels cell and the off condition is activated by energizing the Pockels cell.

17. The laser system of claim 16, wherein the reflective surfaces are located on mirrors positioned away from the laser medium.

* * * * *